United States Patent [19]
Dawes et al.

[11] 3,879,412
[45] Apr. 22, 1975

[54] 1-(4-CHLOROPHENYL)-5-METHYL-3-(0,0-DIETHYLTHIONO PHOSPHORYL)-1,2,4-TRIAZOLE

[75] Inventors: Dag Dawes, Prattele; Beat Boehner, Binningen, both of Switzerland

[73] Assignee: Ciba-Geigy Corporation, Ardsley, N.Y.

[22] Filed: Apr. 1, 1974

[21] Appl. No.: 456,926

Related U.S. Application Data
[63] Continuation-in-part of Ser. No. 217,289, Jan. 12, 1972, abandoned.

[30] Foreign Application Priority Data
Jan. 19, 1971 Switzerland............... 775/71
Oct. 22, 1971 Switzerland............... 15409/71
Nov. 19, 1971 Switzerland............... 16876/71

[52] U.S. Cl........... 260/308 R; 260/308 C; 424/200
[51] Int. Cl. ............................................. C07f 9/16
[58] Field of Search ............................. 260/308 R

[56] References Cited
UNITED STATES PATENTS
3,686,200  8/1972  Scherer et al................. 260/308 R
3,689,500  9/1972  Bohner et al. ................ 260/308 R FOREIGN PATENTS OR APPLICATIONS
713,278  8/1954  United Kingdom............ 260/308 R

*Primary Examiner*—Alton D. Rollins
*Attorney, Agent, or Firm*—Harry Falber

[57] ABSTRACT

The 1,2,4-Triazolylphosphoric acid ester of the formula

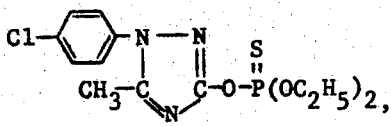

its manufacture and its use in pest control.

1 Claim, No Drawings

1-(4-CHLOROPHENYL)-5-METHYL-3-(0,0-DIETHYLTHIONO PHOSPHORYL)-1,2,4-TRIAZOLE

RELATED APPLICATIONS

This is a continuation-in-part of application Ser. No. 217,289, filed Jan. 12, 1972, and now abandoned.

Prior art patents such as U.S. Pat. No. 3,686,200; U.S. Pat. No. 3,689,500 and British Pat. No. 713,278 disclose various 1,2,4-triazolylphosphoric acid esters, for example the U.S. Pat. No. 3,686,200 teaches the 1-(4-chlorophenyl)-3-(0,0-diethyl-thionophosphoryl)-1,2,4-triazole and the 1-phenyl-3-(0,0-diethyl-thionophosphoryl)-1,2,4-triazole; the U.S. Pat. No. 3,686,500 teaches various 0,0-diethyl-0-[1-methyl-3-phenyl-S-triazolyl-(5)]-phosphorothioates while the British Pat. No. 713,278 teaches the 1-phenyl-5-methyl-3-(0,0-diethylthionophosphoryl)-1,2,4-triazole.

The present invention relates to the 1-(4-chlorophenyl)-3-(0,0-diethyl-thionophosphoryl)-5-methyl-1,2,4-triazole, its manufacture and its use in pest control.

This triazole has the formula

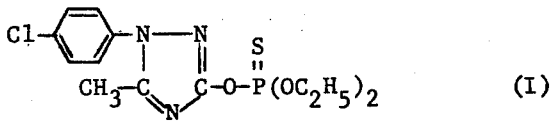

(I)

and may be manufactured by a. reacting the hydroxy-triazole of the formula

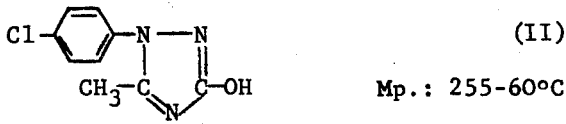

(II)

Mp.: 255-60°C with the phosphoric halide of the formula

(III)

in the presence of an acid binding agent, or b. reacting a salt of the hydroxy-triazole of the formula II with a phosphoric halide of the formula III. In the formula III Hal represents chlorine or bromine.

As salts of hydroxy-triazoles of the formula II which are suitable for the process according to the invention there may be used, for example, salts of monovalent metals, in particular the alkali metal salts; besides these, however, there may be used other salts, for example those of monovalent heavy metals.

As acid binding agents the following bases may for example be used: tertiary amines, such as triethylamine, dimethyl aniline, pyridine bases, inorganic bases, for example hydroxides and carbonates of alkali and alkaline earth metals, preferably sodium and potassium carbonate.

The reactions may be carried out preferably in solvents or diluents which are inert towards the reactants. The following, for example, are suitable for this purpose: aromatic hydrocarbons, such as benzene, toluene, gasolines, halogenated hydrocarbons, chlorobenzene, polychlorobenzenes, bromobenzene, chlorinated alkanes containing 1 to 3 carbon atoms, ethers, such as dioxan, tetrahydrofuran; esters, for example ethyl acetate; ketones, for example methyl ethyl ketone, diethyl ketone, nitriles etc.

The starting material of the formula II is a known compound which can be manufactured according to methods which are known per se. This compound is obtained for example by reacting a correspondingly substituted semi-carbazide with ortho-carboxylic acid ethyl ester, or by firstly acylating a correspondingly substituted semi-carbazide and subsequently effecting cyclisation under alkaline conditions (cf. for example J. B. Chem. Ber. 56, 1797).

The compound of the formula I has a broad biocidal activity spectrum and may be used to combat vegetable and animal pests.

Compared with analogous compounds from the U.S. Pat. No. 3,686,200 and the British Pat. No. 713,278, the compound of the formula I has a surprisingly better insecticidal action, particularly against *Aedes Aegypti* adults, *Heliothis zea* larvae and *Demestes frischii* adults and a better acaricidal action, particularly against *Rhipicephalus bursa* larvae and adults. The compound of the formula I may be used, in addition, to combat all development stages, such as e.g., eggs, larvae, nymphs, pupae and adults of insects of the families: Acrididae, Blattidae, Gryllidae, Gryllotalpidae, Tettigoniidae, Cimicidae, Diaspididae, Pseudococcidae, Chrysomelidae, Coccinellidae, Brucidae, Scarabaeidae, Dermestidae, Tenebrionidae, Curculionidae, Tineidae, Noctuidae, Lymantriidae, Pyralidae, Galleridae, Culicidae, Tipulidae, Stomoxydae, Muscidae, Caliphoridae, Trypetidae, Pulicidae, as well as acarids of the families: Ioxodidae, Argasidae, Tetranychidae, Dermanyssidae.

The insecticidal or acaricidal action can be appreciably broadened and adapted to suit the given circumstances by the addition of other insecticides and/or acaricides. Suitable additives are, for example:

organic phosphorus compounds,
nitrophenols and derivatives,
formamidines,
carbamates and
chlorinated hydrocarbons.

Furthermore, the compound of the formula I possess extraordinarily good properties against plant parasitic nematodes.

The agents according to the invention are prepared in a known manner by the intimate mixing and/or grinding of the active substance of formula I with suitable carriers, optionally with the addition of dispersing agents or solvents which are inert to the active substances. The active substances can be obtained and used in the following forms:

solid preparations:
  dusts, scattering agents, granulates,
  coated granulates, impregnated granulates, and homogeneous granulates;
liquid preparations:
  a. water-dispersible active-substance concentrates: wettable powders, pastes or emulsions;
  b. solutions.

The content of active substance in the described agents is between 0.1 and 95%; it is to be mentioned in this connection that in the case of application from an aeroplane, or by means of other suitable devices, concentrations of up to 99.5% can be employed, or even the pure active substance.

The active substance of formula I can be formulated, for example, as follows:

Dusts

The following substances are used in the preparation of a) 5% dust, and b) a 2% dust:
a)  5   parts of active substances,
   95   parts of talcum;
b)  2   parts of active substance,
    1   part of highly dispersed silicic acid,
   97   parts of talcum.

The active substances are mixed and ground with the carriers.

Granulate

The following substances are used to produce a 5% granulate:

5    parts of active substance,
    0.25 parts of epichlorhydrin,
    0.25 parts of cetyl polyglycol ether,
    3.50 parts of polyethylene glycol,
   91    parts of kaolin (particle size 0.3–0.8 mm).

The active substance is mixed with epichlorhydrin and dissolved with 6 parts of acetone; the polyethylene glycol and cetyl polyglycol ether are then added. The solution thus obtained is sprayed on to kaolin, and the acetone subsequently evaporated off in vacuo.

Wettable powder

The following constituents are used for the preparation of a) a 40%, b) and c) a 25%, and d) a 10% wettable powder:
a)   40    parts of active substance,
      5    parts of sodium lignin sulphonate,
      1    part of sodium dibutyl-naphthalene sulphonate,
     54    parts of silicic acid.
b)   25    parts of active substance,
      4.5  parts of calcium lignin sulphonate
      1.9  parts of Champagne chalk/hydroxyethyl cellulose mixture (1:1),
      1.5  parts of sodium dibutyl naphthalene sulphonate,
     19.5  parts of silicic acid,
     19.5  parts of Champagne chalk,
     28.1  parts of kaolin.
c)   25    parts of active substance,
      2.5  parts of isooctylphenoxy-polyoxyethylene-ethanol
      1.7  parts of Champagne chalk/hydroxyethyl cellulose mixture (1:1),
      8.3  parts of sodium aluminium silicate,
     16.5  parts of kieselguhr,
     46    parts of kaolin.
d)   10    parts of active substance,
      3    parts of a mixture of the sodium salts of saturated fatty alcohol sulphates,
      5    parts of naphthalenesulphonic acid/formaldehyde condensate,
     82    parts of kaolin.

The active substance is intimately mixed, in suitable mixers, with the additives, and the mixture then ground in the appropriate mills and rollers. Wettable powders are obtained which can be diluted with water to give suspensions of any desired concentration.

Emulsifiable concentrates:

The following substances are used to produce a) a 10% and b) a 25% emulsifiable concentrate:
a)   10    parts of active substance,
      3.4  parts of epoxidised vegetable oil,
     13.4  parts of a combination emulsifier consisting of fatty alcohol polyglycol ether and alkylarylsulphonate calsium salt,
     40    parts of dimethylformamide,
     43.2  parts of xylene.
b)   25    parts of active substance,
      2.5  parts of epoxidised vegetable oil,
     10    parts of an alkylarylsulphonate/fatty alcoholpolyglycol ether-mixture,
      5    parts of dimethylformamide,
     57.5  parts of xylene.

From these concentrates it is possible to produce, by dilution with water, emulsions of any desired concentration.

Spray:

The following constituents are used to prepare a 5% spray:

5    parts of active substance,
     1    part of epichlorhydrin,
    94    parts of ligroin (boiling limits 160–190°C).

These solutions were sprayed with pressure sprays.

EXAMPLE 1

0,0-Diethyl-0-1-(4-chlorophenyl)-5-methyl-1,2,4-triazolyl-(3)-thiophosphate a. 18.65 Grams (0.1 M) of 1-(4-chlorophenyl)-semicarbazide and 16.2 g (=18.2 ml) of ortho-acetic triethyl ester are heated together with 40 ml of glycol monomethyl ether, in the process of which a clear yellow solution is obtained. The ethanol which forms is continually distilled off at an internal temperature of 120°C. The residue is cooled after 4½ hours and treated with 200 ml of ether, yielding 1-(4-chlorophenyl)-3-hydroxy-5-methyl-1,2,4-triazole (m.p.: 255°–60°C.

b. 36 Grams (0.172 M) of 1-(4-chlorophenyl)-3-hydroxy-5-methyl-1,2,4-triazole and 23.6 g (0.172 M) of potassium carbonate are heated together with copper powder (from the tip of a spatula) in 400 ml of methyl ethyl ketone and the mixture is boiled for 1 hour under reflux. Then 32.3 g (0.172 M) of 0,0-diethylthiophosphoric chloride are added dropwise at 50°C. The reaction mixture is refluxed for 3 hours and the solvent then evaporated in vacuo. The residue (59 g) is taken up in 500 ml of ether and washed successively with water, 0.5N HCl, saturated bicarbonate solution and sodium chloride solution. After drying the ether solution over sodium sulphate. The ether is evaporated in vacuo, leaving as residue 43.8 g of crude product. This product is filtered over 800 g of silica gel using methylene chloride as solvent, to yield 0,0-Diethyl-0-1-(4-chlorophenyl)-5-methyl-1,2,4-triazolyl-(3)-thiophoshpate ($n_D^{20}$: 1.5484).

EXAMPLE 2

Comparative Test

Test compounds:

A 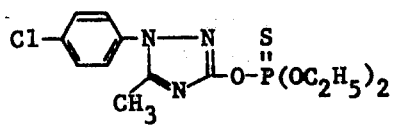 Compound of formula I

B 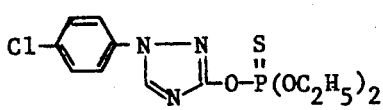 U.S. Patent No.3 686 200
Claim 7

Test animals
  *Dermestes frischii* Larvae
Test preparation 5   parts of active ingredient
  95  parts of talc Test The test preparation was applied to filter paper in a concentration of 12.5 mg per m². Groups of 5 test animals of the type indicated above are placed on the treated substrates. After 24 hours the experiment is evaluated.

Results

| Test compound | % mortality after 24 hours of *Dermestes frischii* Larvae |
|---|---|
| A | 100 |
| B | 0 |

Result

| Test compound | % Mortality of *Aedes aegypti* adults in X time |
|---|---|
| A | 100 in 120 minutes |
| B | 0 in 24 hours |

Conclusion

Compound A is 100% in 120 minutes effective against *Aedes aegypti* adults. Whereas compound B is ineffective (0%) in 24 hours against this insect.

EXAMPLE 4

Comparative Test

Test compounds:

A 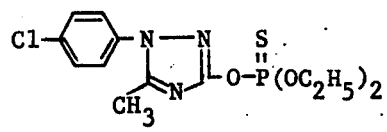 Compound of formula I

B 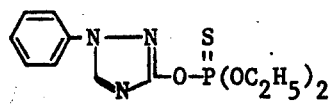 U.S. Patent No.3 686 200
Claim 3

Conclusion

The compound A is in a concentration of 12.5 mg/m² 100% effective against *Dermestes frischii* Larvae whereas compound B is at this concentration ineffective 10% against *Dermestes frischii* Larvae.

EXAMPLE 3

Comparative Test

Test compounds:

A 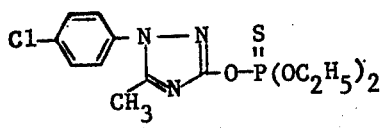

B 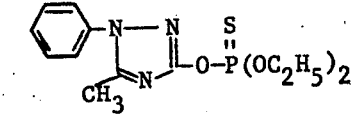

Test animals
  *Aedes aegypti* adults
Test preparation
  Acetonic solutions of the active ingredients A and B.

Test
  Coatings of the acetonic solution of test substances where applied in Petri dishes, whereby a concentration of 1 mg of test substance per dish was used.

20 *Aedes aegypti* adults were placed in the dishes after 1 hour. The time is evaluated after which all insects lying on their back.

Test animals
  *Heliothis zea* larvae
Test preparation 10    parts of active substance,
  3.4   parts of epoxidised vegetable oil,
  13.4  parts of a combination emulsifier consisting of fatty alcohol polyglycol ether and alkyl-arylsulphonate calcium salt,
  40    parts of dimethylformamide,
  43.2  parts of xylene.

Compound of formula I

British Patent
No. 713 278

Test
  Cotton plants were sprayed with a 0.05% aqueous emulsion (obtained from a 10% emulsifiable concentrate). After the coating has dried 10 *Heliothis zea* larvae were settled on each of the cotton plants.
  The test was carried out at 24°C and 60% relative humidity.

Results

| Test compound | % mortality after 48 hours of *Heliothis zea* larvae |
|---|---|
| A | 100 |
| B | 0 |

Conclusion

Compound A is 100% in 48 hours effective against *Heliothis zea* larvae whereas compound B is ineffective (0%) in 48 hours against this insect.

EXAMPLE 5

Comparative Test

Test Compounds:

A 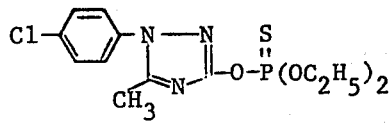

B 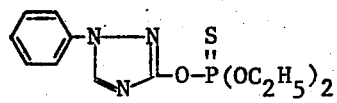

Test animals

*Rhipicephalus bursa* adults and larvae.

Test preparation

| | |
|---|---|
| 10 | parts of active substance. |
| 3.4 | parts of epoxidised vegetable oil. |
| 13.4 | parts of a combination emulsifier consisting of fatty alcohol polyglycol ether and alkyl-arylsulphonate calcium salt, |
| 40 | parts of dimethylformamide. |
| 43.2 | parts of xylene. |

Test

5 Tick adults and 50 Tick larvae were dipped in an emulsion containing 0.1 ppm active ingredient. Evaluation 3 days after application for larvae and 2 weeks for adults.

Results

| Test compounds | % mortality after 3 days of *Rhipicephalus bursa* larvae | % mortality after 2 weeks of *Rhipicephalus bursa* adults |
|---|---|---|
| A | 100 | 100 |
| B | 0 | 0 |

Conclusion

A 0.1 ppm emulsion of compound A is 100% active against adults and larvae of *Rhipicephalus bursa*

Compound of formula I

U.S. Patent No. 3 686 200
Claim 3 whereas compound B is at this concentration ineffective.

We claim:

1. The compound of the formula

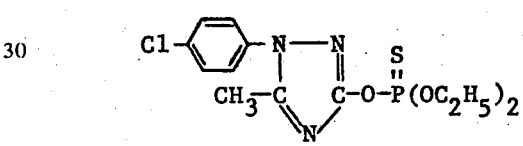

* * * * *